United States Patent
Pietron et al.

(10) Patent No.: US 9,371,066 B2
(45) Date of Patent: *Jun. 21, 2016

(54) ADJUSTING CLUTCH SLIP BASED ON SENSED PARAMETER OF TRANSMISSION SHAFT TO CONTROL VEHICLE NVH

(71) Applicant: Ford Global Technologies, LLC, Dearborn, MI (US)

(72) Inventors: Gregory Michael Pietron, Canton, MI (US); Yuji Fujii, Ann Arbor, MI (US); Diana Yanakiev, Birmingham, MI (US); Joseph F. Kucharski, Livonia, MI (US); Nimrod Kapas, Canton, MI (US); Alexander O'Connor Gibson, Ann Arbor, MI (US); Seung-Hoon Lee, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/511,557

(22) Filed: Oct. 10, 2014

(65) Prior Publication Data

US 2015/0024904 A1    Jan. 22, 2015

Related U.S. Application Data

(63) Continuation of application No. 13/685,793, filed on Nov. 27, 2012, now Pat. No. 8,882,636.

(51) Int. Cl.
*B60W 10/02*    (2006.01)
*B60W 10/11*    (2012.01)
*B60W 30/18*    (2012.01)

(52) U.S. Cl.
CPC ............... *B60W 10/11* (2013.01); *B60W 10/02* (2013.01); *B60W 10/026* (2013.01); *B60W 30/18* (2013.01);

(Continued)

(58) Field of Classification Search
CPC .......... B60W 30/20; B60W 2510/104; B60W 2510/1045; B60W 2510/105; B60W 2030/203; B60W 10/026; B60W 10/02; B60W 2510/0241; Y10T 477/368; Y10T 477/26; Y10T 477/6425; Y10T 477/6414; Y10T 477/755
USPC ........................................................... 701/67
See application file for complete search history.

(56) References Cited

U.S. PATENT DOCUMENTS 5,305,663 A    4/1994 Leonard et al.
5,413,539 A    5/1995 Leonard et al.
(Continued)

FOREIGN PATENT DOCUMENTS

CN    1896563 A    1/2007
CN    101270696 A    9/2008

OTHER PUBLICATIONS

United States Patent and Trademark Office, Office Action for the underlying U.S. Appl. No. 13/685,793 mailed Jul. 24, 2014.
(Continued)

*Primary Examiner* — Roger Pang
(74) *Attorney, Agent, or Firm* — James Dottavio; Brooks Kushman P.C.

(57) ABSTRACT

A vehicle powertrain includes a transmission and a clutch. The slip of the clutch is adjusted to a predefined target where a sensed parameter of a shaft of the transmission corresponds to a specified noise, vibration, and harshness (NVH) level in the powertrain. The sensed parameter of the transmission shaft may be one of acceleration, speed, and torque of the transmission shaft. The transmission shaft may be one of the input shaft and output shaft of the transmission.

13 Claims, 4 Drawing Sheets

(52) U.S. Cl.
CPC ....... *B60W 2510/0241* (2013.01); *Y10T 477/26* (2015.01); *Y10T 477/638* (2015.01); *Y10T 477/6414* (2015.01); *Y10T 477/6425* (2015.01); *Y10T 477/755* (2015.01)

(56) References Cited

U.S. PATENT DOCUMENTS

| | | | |
|---|---|---|---|
| 5,417,621 | A | 5/1995 | Tibbles |
| 5,439,428 | A | 8/1995 | Slicker |
| 5,527,238 | A | 6/1996 | Hrovat et al. |
| 6,231,479 | B1 | 5/2001 | Kraska et al. |
| 6,273,226 | B1 | 8/2001 | Honemann et al. |
| 6,487,925 | B2 | 12/2002 | Fischer et al. |
| 6,846,260 | B2 | 1/2005 | Horiuchi |
| 7,188,717 | B2 | 3/2007 | Hoshiya et al. |
| 7,349,785 | B2 | 3/2008 | Lee et al. |
| 7,361,120 | B2 | 4/2008 | Iida et al. |
| 7,651,441 | B2 | 1/2010 | Maguire et al. |
| 8,758,200 | B2 | 6/2014 | Dai et al. |
| 8,882,636 | B2 * | 11/2014 | Pietron ................. B60W 10/02 477/176 |
| 2002/0082761 | A1 | 6/2002 | Baeuerle |
| 2005/0182533 | A1* | 8/2005 | Tobler .................... B60K 6/48 701/22 |
| 2007/0000745 | A1 | 1/2007 | Cameron et al. |
| 2008/0234106 | A1 | 9/2008 | Maguire et al. |
| 2008/0288146 | A1 | 11/2008 | Beechie et al. |
| 2009/0150032 | A1* | 6/2009 | Samie ................. G01M 13/022 701/51 |
| 2009/0171545 | A1 | 7/2009 | Shimizu et al. |
| 2009/0181824 | A1 | 7/2009 | Baeuerle |
| 2010/0185373 | A1 | 7/2010 | Herter et al. |
| 2011/0166757 | A1* | 7/2011 | Otanez ................. B60W 50/06 701/60 |
| 2012/0028759 | A1 | 2/2012 | Tsujimura et al. |
| 2012/0081051 | A1 | 4/2012 | Kobayashi et al. |
| 2012/0083953 | A1* | 4/2012 | Izawa ................... B60W 30/20 701/22 |
| 2013/0151099 | A1 | 6/2013 | Chae et al. |
| 2013/0296128 | A1* | 11/2013 | Nefcy .................... F16D 48/02 477/5 |

OTHER PUBLICATIONS

Chinese Patent Office, First Chinese Office Action for the corresponding Chinese Patent Application No. 201310606754.7 dated Apr. 28, 2015.

* cited by examiner

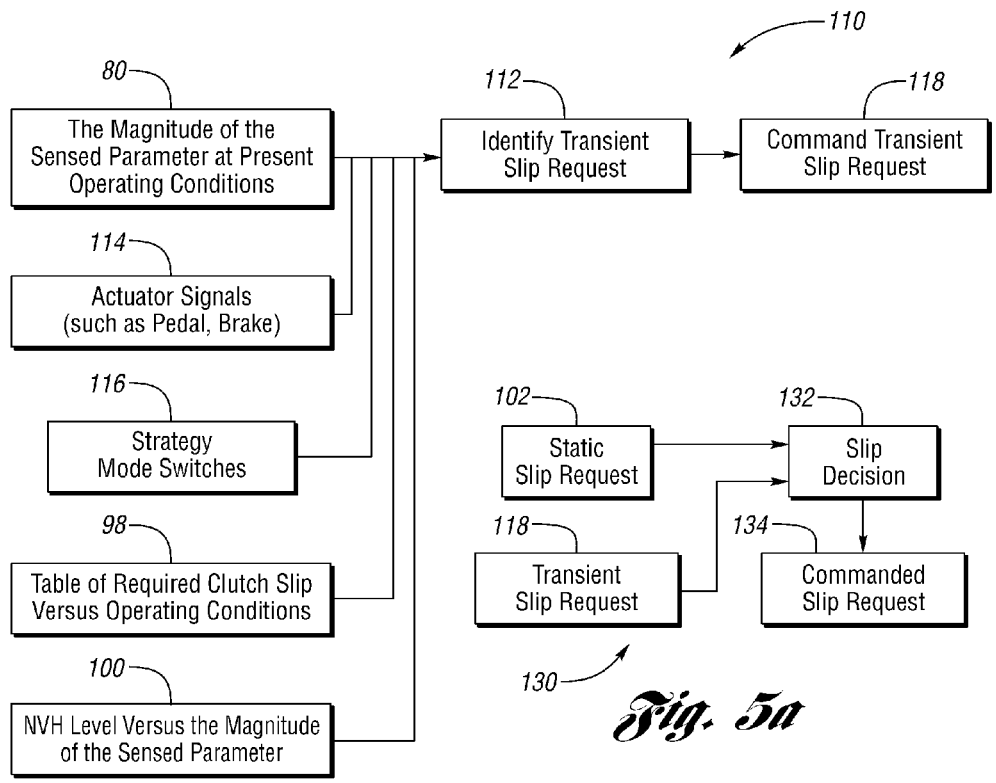
Fig. 5
Fig. 5a
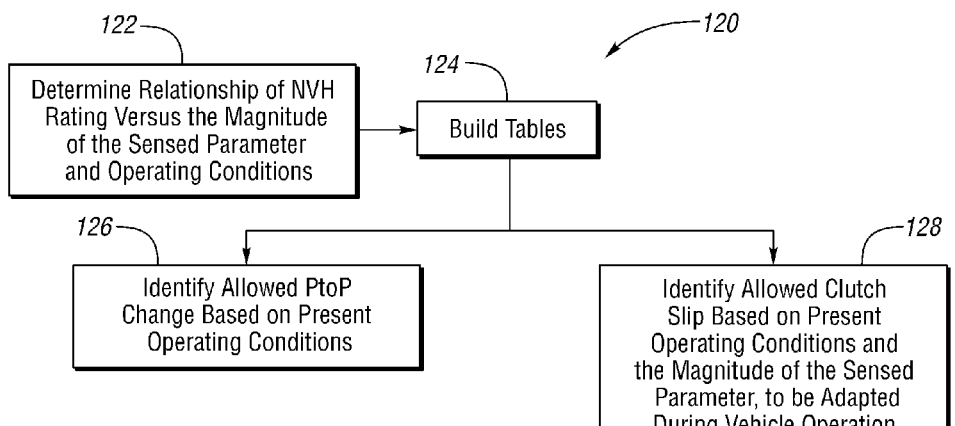
Fig. 6

US 9,371,066 B2

ADJUSTING CLUTCH SLIP BASED ON SENSED PARAMETER OF TRANSMISSION SHAFT TO CONTROL VEHICLE NVH

CROSS-REFERENCE TO RELATED APPLICATIONS

This application is a continuation of U.S. application Ser. No. 13/685,793, filed Nov. 27, 2012, the disclosure of which is hereby incorporated in its entirety by reference herein.

TECHNICAL FIELD

The present invention relates to adjusting slip of a clutch upstream of a transmission in order to control noise, vibration, and harshness (NVH) effects in the vehicle powertrain.

BACKGROUND

Vehicle powertrains include an engine and a transmission, wherein torque (or power) produced by the engine is transferred to the drive wheels through the transmission. In some powertrains, the engine is connected to the transmission via a clutch such as a bypass clutch on a torque converter equipped transmission or an input clutch on a dual clutch or automated manual transmission. Herein, the bypass clutch on a torque converter will be used to refer to either clutch type.

The slip of the bypass clutch is indicative of the amount of engagement of the torque converter. Operation of the bypass clutch at a high slip provides a large hydrodynamic coupling between the engine and the transmission which dampens driveline disturbances caused by torque disturbances from the engine, but reduces energy efficiency of the vehicle. Operation of the bypass clutch at a low slip provides a small hydrodynamic coupling between the engine and the transmission which does not attenuate the driveline disturbances, but provides improved energy efficiency of the vehicle. As described, the clutch slip allows for a reduction in the amount of engine torsional disturbance that reaches the transmission input and ultimately the vehicle occupants. The driveline disturbances are a measure of noise, vibration, and harshness (NVH) effects in the vehicle powertrain. Thus, while a large clutch slip reduces the NVH effects, it increases fuel consumption.

An off-line process which includes evaluation by vehicle NVH experts has been used to determine a desired amount of clutch slip (corresponding to a tolerable amount of NVH) for a given vehicle operating state. This process develops tables of allowable clutch slip versus various vehicle operating states such as engine speed, engine torque, gear selected, and temperature. This procedure is based on audible and tactile inputs to the driver.

Other NVH methods use measured acceleration of the transmission input shaft. The input shaft acceleration is felt to be the controlling factor of NVH level by some in the NVH community and is used as the quantitative underpinning of a qualitative process. Tables are built to relate acceptable NVH level to transmission input shaft acceleration, and transmission input shaft acceleration versus clutch slip.

The tables developed from the noted processes do not take into account all possible contributors to the excitation, nor do they take into account vehicle aging. As such, the tables may be inaccurate leading either to unacceptable NVH level or excessive fuel consumption.

SUMMARY

In one embodiment, a method for a powertrain having a transmission and a clutch is provided. The method includes adjusting slip of the clutch to a predefined target in which torque of a shaft of the transmission corresponds to a specified level of noise, vibration, and harshness (NVH) in the powertrain.

The shaft may be an input shaft or an output shaft of the transmission.

The method may further include sensing the torque of the shaft using a sensor in communication with the shaft and detecting an amount of NVH in the powertrain based on the torque of the shaft. The slip of the clutch may be adjusted to the target such that the amount of NVH in the powertrain based on the torque of the shaft corresponds to the specified level of NVH. The amount of NVH may be detected based on a magnitude of the torque of the shaft, wherein the magnitude of the torque is one of peak-to-peak change, half peak-to-peak change, and root-mean-square of the torque of the shaft.

In one embodiment, another method for a powertrain having a transmission and a clutch is provided. This method includes detecting an amount of NVH in the powertrain based on torque of a shaft of the transmission and adjusting slip of the clutch to a predefined target corresponding to a specified level of NVH upon the amount of NVH exceeding the specified level. The shaft may be an input shaft or an output shaft of the transmission.

This method may further include sensing the torque of the shaft using a sensor in communication with the shaft to detect the amount of NVH based on the torque of the shaft.

In one embodiment, another method for a powertrain having a transmission and a clutch is provided. This method includes adjusting slip of the clutch to a predefined target in which a sensed parameter of an output shaft of the transmission corresponds to a specified level of NVH in the powertrain. The sensed parameter of the output shaft may be torque, speed, or acceleration of the output shaft.

BRIEF DESCRIPTION OF THE DRAWINGS

FIG. 5 illustrates a flowchart describing operation of the control strategy in identifying a transient clutch slip request;

FIG. 5A illustrates a flowchart describing operation of the control strategy in arbitrating between the static slip request and the transient slip request; and FIG. 6 illustrates a flowchart describing operation of the control strategy in an off-line identification process for building base tables.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
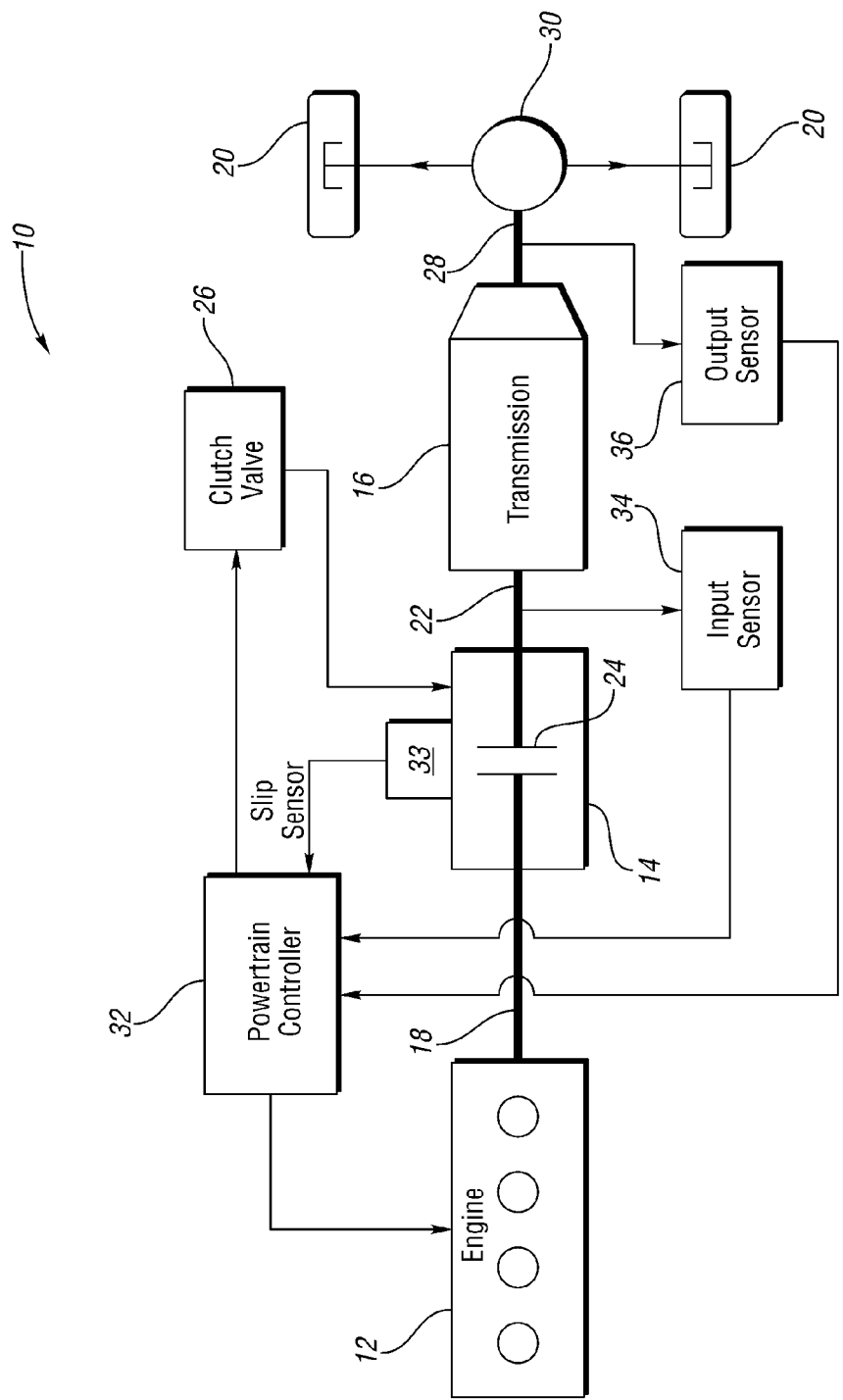
FIG. 1 illustrates a block diagram of an exemplary vehicle powertrain in accordance with an embodiment of the present invention.

Referring now to FIG. 1, a block diagram of an exemplary powertrain system 10 for a vehicle in accordance with an embodiment of the present invention is shown. Powertrain system 10 includes an engine 12, a torque converter 14, and a multiple-ratio automatic transmission 16. Output shaft 18 of engine 12 is connected to the upstream side of torque converter 14. The upstream side of transmission 16 is connected to the downstream side of torque converter 14 and the downstream side of transmission 16 is connected to drive wheels 20 of the vehicle. The driving force applied from engine 12 is transmitted through torque converter 14 and transmission 16 to drive wheels 20 thereby propelling the vehicle.

Torque converter 14 includes an impeller rotor fixed to output shaft 18 of engine 12 and a turbine rotor fixed to input shaft 22 of transmission 16. The turbine of torque converter 14 can be driven hydro-dynamically by the impeller of torque converter 14. Thus, torque converter 14 may provide a hydraulic coupling between engine output shaft 18 and transmission input shaft 22.

Torque converter 14 further includes a torque converter clutch 24 (i.e., bypass clutch 24). Bypass clutch 24 is controllable between an engaged position (i.e., a locked-up position, an applied position, etc.) and a disengaged position (i.e. an unlocked position, etc.). In the engaged position, bypass clutch 24 frictionally couples the impeller and the turbine of torque converter 14, which eliminates the hydraulic coupling between these components. In the disengaged position, bypass clutch 24 permits the hydraulic coupling between these components.

When bypass clutch 24 is disengaged, the hydraulic coupling of torque converter 14 absorbs and attenuates vibrations and disturbances in the powertrain. The source of such disturbances includes the engine torque from engine 12 for propelling the vehicle. Fuel economy of the vehicle is reduced when bypass clutch 24 is disengaged due to the losses associated with the hydraulic coupling.

Bypass clutch 24 may be controlled through operation of a clutch valve 26. In response to a control signal, clutch valve 26 pressurizes and vents bypass clutch 24 to engage and disengage the frictional coupling between the impeller and turbine. The apply pressure of bypass clutch 24 can be controlled so that bypass clutch 24 is neither fully engaged nor fully disengaged and instead is modulated to produce a variable magnitude of slip between the impeller and turbine in torque converter 14. The slip of torque converter 14 (i.e., the slip of bypass clutch 24, the clutch slip) corresponds to the difference in the speeds of the impeller and the turbine of torque converter 14. The clutch slip decreases as bypass clutch 24 approaches the engaged position and increases as bypass clutch 24 approaches the disengaged position.

Engine 12 is an internal combustion engine such as a gasoline, diesel, or natural gas powered engine and is a primary source of power for powertrain system 10. Engine 12 generates an engine power and corresponding engine torque is supplied via engine output shaft 18. The engine power corresponds to the product of engine torque and the engine speed. At least a portion of the engine torque passes from engine 12 through torque converter 14 to transmission 16 in order to drive the vehicle with engine 12.

Transmission 16 includes multiple discrete gear ratios. Transmission 16 includes an output shaft 28 that is connected to a differential 30. Drive wheels 20 are connected to differential 30 through respective axles. With this arrangement, transmission 16 transmits a powertrain output torque to drive wheels 20.

Transmission 16 includes planetary gear sets (not shown) that are selectively placed in different gear ratios by selective engagement of friction elements (not shown) to establish the desired multiple discrete drive ratios. The friction elements are controllable through a shift schedule that connects and disconnects elements of the planetary gear sets to control the ratio between the transmission output and the transmission input. Transmission 16 is automatically shifted from one ratio to another based on the needs of the vehicle and provides a powertrain output torque to transmission output shaft 28 which ultimately drives drive wheels 20. The kinetic details of transmission 16 can be implemented by a wide range of transmission arrangements. Transmission 16 is an example of a transmission arrangement for use with embodiments of the present invention. Any multiple ratio transmission that accepts an input torque and then provides torque to an output shaft at the different ratios is acceptable for use with embodiments of the present invention.

Powertrain system 10 further includes a powertrain controller 32 which constitutes a vehicle system controller. Controller 32 is configured to control the operation of engine 12. Controller 32 is further configured to control the operation of bypass clutch 24 via clutch valve 26. Again, the slip of torque converter 14 (i.e., the slip of bypass clutch 24, the clutch slip) corresponds to the difference between the input and output rotational speeds of torque converter 14. The output rotational speed approaches the input rotational speed as bypass clutch 24 approaches the engaged position such that the clutch slip decreases. Conversely, the output rotational speed diverges from the input rotational speed as bypass clutch 24 approaches the disengaged position such that the clutch increases. The clutch slip may be measured or estimated using one or more corresponding sensors and operating parameters. For example, powertrain system 10 further includes a slip sensor 33 configured to sense the clutch slip and provide information indicative of the clutch slip to controller 32.

Powertrain system 10 further includes a transmission input shaft sensor 34 ("input sensor 34") and a transmission output shaft sensor 36 ("output sensor 36"). Input sensor 34 is associated with input shaft 22 of transmission 16 and is configured to sense the torque and/or speed of transmission input shaft 22. Output sensor 36 is associated with output shaft 28 of transmission 16 and is configured to sense the torque and/or speed of transmission output shaft 28.

Either sensor 34, 36 may be a strain-gauge base system, a force-resistive elastomer sensor, a piezoelectric load cell, or a magneto-elastic torque sensor. In one embodiment, each sensor 34, 36 is a magneto-elastic torque sensor as described in U.S. Pat. Nos. 6,145,387; 6,047,605; 6,553,847; and 6,490,934. Such magneto-elastic torque sensors enable accurate measurements of torque exerted onto a rotating shaft without requiring a physical contact between a magnetic flux sensing element and the shaft. Each torque sensor 34, 36 may include a counterpart sensor for sensing speed and/or acceleration of the respective shafts or may be further configured for sensing by themselves the speed and/or the acceleration of the respective shafts.

As described, sensors 34, 36 are in communication with transmission input shaft 22 and transmission output shaft 28, respectively, and are configured to sense the torque and/or speed and/or acceleration of the corresponding shafts. Sensors 34, 36 respectively provide sensor signals indicative of the torque and/or speed and/or acceleration of the corresponding shafts to controller 32.

According to a control strategy in accordance with embodiments of the present invention, controller 32 uses the sensor signals from at least one of sensors 34, 36 to control the clutch slip (i.e., bypass clutch 24) in order to reduce the noise, vibration, and harshness (NVH) effects in powertrain system 10. The controller adjusts the slip of clutch 24 to a target where a magnitude of a sensed parameter of a shaft of transmission 26 corresponds to a desired NVH level in powertrain system 10. The shaft of transmission 26 may be either transmission input shaft 22 or transmission output shaft 28. The sensed parameter of transmission shaft 22, 28 may be one of torque, speed, and acceleration of transmission shaft 22, 28. The magnitude of the sensed parameter of transmission shaft 22, 28 may be, for example, one of the peak-to-peak change, half peak-to-peak change, and root-mean-square (RMS) value of the sensed parameter of transmission shaft 22, 28.

For example, the control strategy controls the clutch slip based on the magnitude of the peak-to-peak change (i.e., "fluctuation" as used herein), half peak-to-peak change, and RMS value of at least one of: (i) the torque of transmission input shaft 22, (ii) the speed of transmission input shaft 22, (iii) the acceleration of transmission input shaft 22; (iv) the torque of transmission output shaft 28, (v) the speed of transmission output shaft 28, and/or (vi) the acceleration of transmission output shaft 28 in order to reduce the NVH effects. Collectively, items (i) through (vi) are referred to as transmission input/output shaft torque/speed/acceleration peak-to-peak change/half peak-to-peak change/RMS value.

The item (i) of the magnitude of the peak-to-peak change of the torque of transmission input shaft 22 will be used herein when referring to any of items (i) through (vi) individually. In item (i), the transmission shaft is transmission input shaft 22, the sensed parameter is the torque of transmission input shaft 22, and the magnitude of the sensed parameter of transmission input shaft 22 is the peak-to-peak change of the torque of the transmission input shaft 22.

The peak-to-peak change of a variable is the difference in magnitude between the maximum positive and the maximum negative amplitudes of the variable. As such, the peak-to-peak change of a variable is the difference between the maximum and minimum amplitudes of the variable. For example, the peak-to-peak change of the torque of transmission input shaft 22 is the difference in magnitude between the maximum amplitude of the torque of transmission input shaft 22 and the minimum amplitude of the torque of transmission input shaft 22. Likewise, the half peak-to-peak change of a variable and the RMS value of a variable are used herein in accordance with their ordinary meanings.

The control strategy provides a closed-loop control of the clutch slip (e.g., a closed-loop control of bypass clutch 24) to reduce NVH effects such as those produced by firing pulses of engine 12. The magnitude of the sensed parameter of the transmission shaft corresponds to the NVH level present in a vehicle powertrain such as powertrain system 10. Thus, for instance, the peak-to-peak change in the torque of transmission input shaft 22 is a surrogate for the NVH level present in powertrain system 10. The control strategy is based on, in real time, reading torque changes or fluctuations of transmission input shaft 22 using input sensor 34 in order to learn of the amount of NVH present and adjusting bypass clutch 24 to have a desired level of clutch slip which will provide a tolerable amount of NVH.

The control strategy ensures uniform engine excited NVH based on a robust method to measure and adjust measured engine excitation by closed-loop control of the clutch slip. As described herein, the method may further feed forward clutch slip based on anticipated changes in vehicle operating conditions and adapt clutch slip tables based on measured engine excitation.

Again, in one embodiment, the control strategy uses input sensor 34 to measure the magnitude of the peak-to-peak change in the torque of transmission input shaft 22. The magnitude of the peak-to-peak change in the torque of transmission input shaft 22 corresponds to the level of NVH present in powertrain system 10. Similarly, in another embodiment, the control strategy uses input sensor 34 to measure the magnitude of the peak-to-peak change in the speed (or acceleration) of transmission input shaft 22. The magnitude of the peak-to-peak change in the speed (or acceleration) of transmission input shaft 22 corresponds to the level of NVH present in powertrain system 10. Likewise, in other embodiments, the control strategy uses output sensor 36 to measure the magnitude of the peak-to-peak change in the torque and/or speed and/or acceleration of transmission output shaft 28. The magnitude of the peak-to-peak change in the torque, speed, and acceleration of transmission output shaft 22 each corresponds to the level of NVH present in powertrain system 10.

As indicated above, using input sensor 34 to measure the magnitude of the peak-to-peak change in the torque of transmission input shaft 22 in order to learn of the NVH level present in powertrain system 10 is used herein as the example. The control strategy uses the torque measurement of transmission input shaft 22 to correlate between vehicle NVH ratings and the peak-to-peak change in the torque of transmission input shaft 22 under multiple vehicle operating conditions.

In general, the control strategy includes: calculating an acceptable amount of transmission input shaft torque peak-to-peak measurement based on NVH rating required or requested; instantaneously adjusting a clutch slip target to meet the desired peak-to-peak torque level; and measuring actual peak-to-peak torque at a measured slip and adjusting the amount of clutch slip to reduce peak-to-peak torque (and thereby NVH level) to an acceptable level. As such, the latter step provides a closed-loop control on peak-to-peak torque (i.e., NVH).

Other aspects of the control strategy may include the following. A calibration process is outlined for gathering data for base calibration tables. A multi-dimensional table of clutch slip versus peak-to-peak torque table is updated as a function of vehicle operating conditions. Minimum and maximum clutch slip levels can be considered to prevent over adjustment. Feed forward features are provided to predict required clutch slip level based on vehicle operating conditions and inputs such as accelerator pedal and engine speed using the learned tables. Conditions where sensor acceleration is not due to engine firing frequency are identified and the response to those conditions is appropriately limited. For example, a filter to match multiples of engine speed (orders) to filter out road inputs can be employed.

Figure 2:
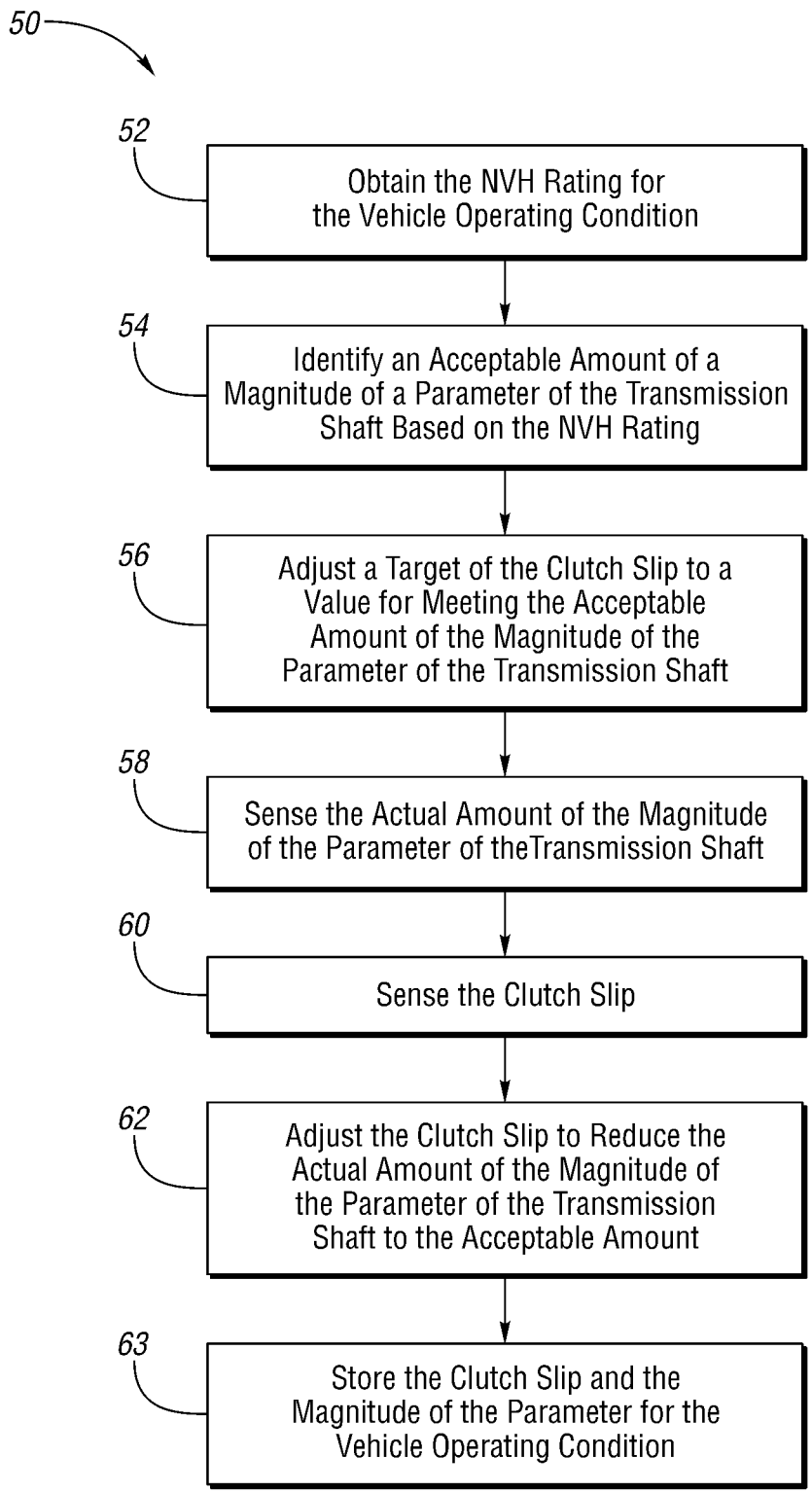
FIG. 2 illustrates a flowchart describing the general operation of a control strategy in accordance with an embodiment of the present invention for adjusting slip of a clutch of a vehicle powertrain to a target where a magnitude of a sensed parameter of a shaft of a transmission of the vehicle powertrain corresponds to a desired NVH level in a vehicle powertrain.

Referring now to FIG. 2, with continual reference to FIG. 1, a flowchart 50 describing the general operation of a control strategy in accordance with an embodiment of the present invention for adjusting the clutch slip (e.g., for adjusting the slip of bypass clutch 24) to a target where a magnitude (peak-to-peak change, half peak-to-peak change, RMS value, etc.) of a sensed parameter (torque, speed, acceleration) of a shaft of transmission 16 (transmission input shaft 22, transmission output shaft 28) corresponds to a desired NVH level to thereby control NVH effects in a vehicle powertrain is shown.

Again, the magnitude of the transmission input shaft torque peak-to-peak change will be used as the representative example.

The general operation of the control strategy includes obtaining a required or requested NVH rating for a given vehicle operating condition as shown in block 52. An acceptable amount of a magnitude of a parameter of the shaft (e.g., the shaft torque peak-to-peak change) based on the requested NVH rating is identified to controller 32 as shown in block 54. Controller 32 adjusts a target of the clutch slip to a value for meeting the acceptable amount of the magnitude of the parameter of the shaft (e.g., the shaft torque peak-to-peak change) as shown in block 56. Input sensor 34 senses the actual amount of the magnitude of the parameter of the shaft (e.g., the shaft torque peak-to-peak change) and provides information indicative of same to controller 32 as shown in block 58. Slip sensor 33 senses the actual amount of clutch slip and provides information indicative of same to controller as shown in block 60. Controller 32 adjusts the clutch slip to the target in order reduce the actual amount of the magnitude of the parameter of the shaft (e.g., the shaft torque peak-to-peak change), and thereby the NVH level present, to the acceptable amount, and thereby to the requested NVH rating, as shown in block 62. The clutch slip and the magnitude of the parameter for the vehicle operating condition are then stored as shown in block 63.

Figure 3:
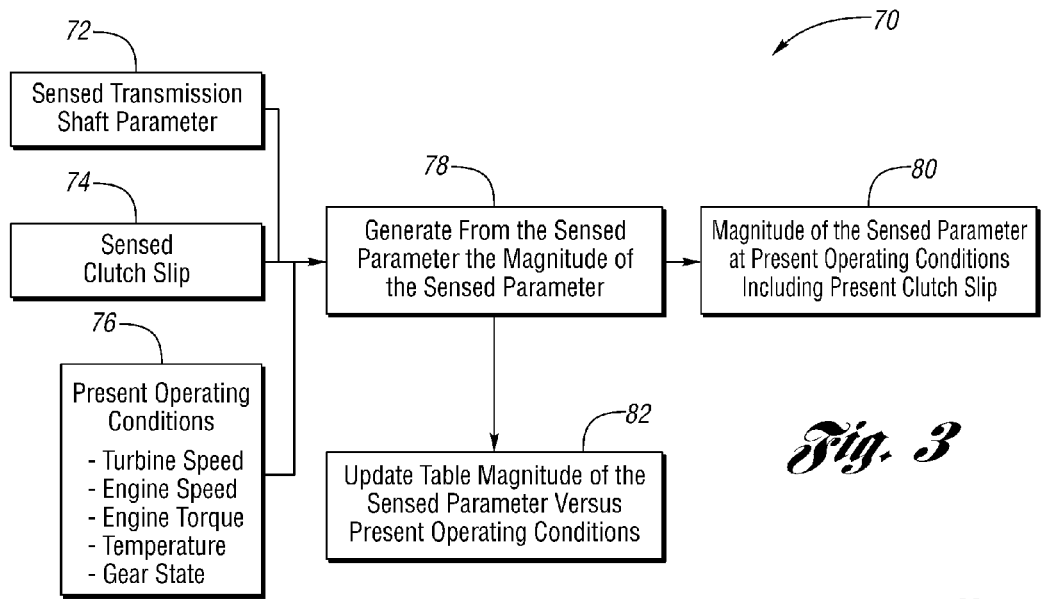
FIG. 3 illustrates a flowchart describing operation of the control strategy in generating information regarding the magnitude of the sensed parameter of the transmission shaft.

Referring now to FIG. 3, with continual reference to FIGS. 1 and 2, a flowchart 70 describing operation of the control strategy in generating information regarding the magnitude of the sensed parameter of the transmission shaft is shown. Again, the magnitude of the transmission input shaft torque peak-to-peak change will be used as the representative example.

This operation includes controller 32 obtaining from input sensor 34 the sensed transmission shaft parameter (e.g., shaft torque) as shown in block 72. Controller 32 obtains from slip sensor 33 the sensed clutch slip as shown in block 74. Controller 32 further obtains information indicative of the current operating conditions including turbine speed, engine speed, engine torque, temperature, and gear state as shown in block 76.

Controller 32 uses the sensed parameter to generate the magnitude of the sensed parameter as shown in block 78. For instance, controller uses the sensed torque to generate the torque peak-to-peak change in block 78. Controller 32 identifies the magnitude of the sensed parameter at the current operating conditions along with the measured clutch slip as shown in block 80. For instance, controller 32 identifies the shaft torque peak-to-peak change at the current operating conditions along with the measured clutch slip in block 80. Controller 32 updates a table of magnitude of the sensed parameter versus vehicle operating conditions with the information identified by controller 32 in block 80 as shown in block 82. For instance, in block 82, controller 32 updates a table of torque peak-to-peak change versus vehicle operating conditions with the information identified by controller 32 in block 80. The table of torque peak-to-peak change versus vehicle operating conditions is multidimensional as the shaft torque peak-to-peak is a function of clutch slip and various operating conditions. The various operating conditions include gear mode; engine torque; engine, transmission, or other temperature that is measurable and affects NVH level; and engine speed and vehicle speed.

Controller 32 employs the following operations in generating information regarding the magnitude of the shaft torque peak-to-peak change. Controller 32 recalls the time of the last peak and detects the current peak from the shaft torque signal from input sensor 34. Controller 32 calculates a moving average of the shaft torque peak-to-peak and a moving average of the actual shaft torque. Controller 32 calculates a moving average of the clutch slip and the other operating conditions. Controller 32 then updates the table of torque peak-to-peak change versus operating conditions.

Figure 4:
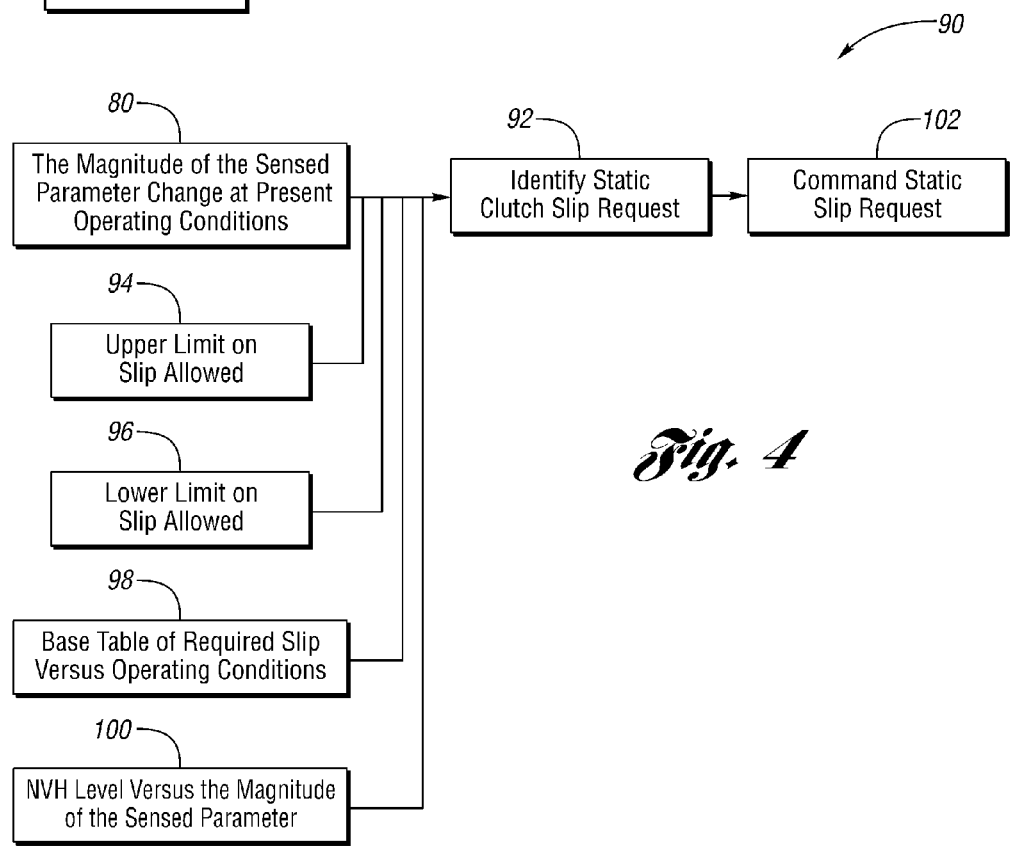
FIG. 4 illustrates a flowchart describing operation of the control strategy in identifying a static clutch slip request.

Referring now to FIG. 4, with continual reference to FIGS. 1, 2, and 3, a flowchart 90 describing operation of the control strategy in identifying a static clutch slip request is shown. Again, the magnitude of the transmission input shaft torque peak-to-peak change will be used as the representative example. Controller 32 identifies a static clutch slip request at block 92 based on various inputs. As shown in FIG. 4, the various inputs include: the magnitude of the sensed parameter (e.g., the shaft torque peak-to-peak change) at the current operating conditions including the measured clutch slip of block 80; an upper limit of allowed clutch slip as shown in block 94; a lower limit of allowed clutch slip as shown in block 96; a base table of required clutch slip versus operating conditions as shown in block 98; and the NVH level versus the magnitude of the sensed parameter (e.g., the torque peak-to-peak change) (again, the torque peak-to-peak change is a surrogate for the NVH level) as shown in block 100. Controller 32 commands the static clutch slip request to clutch valve 26 in order to control the clutch slip accordingly as shown in block 102.

The base table of required clutch slip versus operating conditions contains a base level of clutch slip to meet NVH requirements for base or starting condition. This information is updated over time as controller 32 updates the table of the magnitude of the sensed parameter (e.g., torque peak-to-peak change) versus operating conditions in block 82 per the processing shown in FIG. 3.

Controller 32 employs the following operations in identifying the static clutch slip request. Controller 32 calculates a NVH level based on the magnitude of the sensed parameter (e.g., shaft torque peak-to-peak change) at the current operating conditions. Controller 32 uses the learned magnitude of the sensed parameter (e.g., shaft torque peak-to-peak) versus clutch slip and operating conditions to calculate clutch slip required at the magnitude of the sensed parameter (e.g., shaft torque peak-to-peak change). Controller 32 checks if the clutch slip at the operating conditions is out of bounds low or out of bounds high based on the lower and upper limits on clutch slip allowed. Controller 32 clips the commanded static clutch slip request based on these limits. Controller 32 adjusts the commanded clutch slip to match clutch slip required if not using transient adjustment (which is described with reference to FIG. 5).

Referring now to FIG. 5, with continual reference to FIGS. 1, 2, 3, and 4, a flowchart 110 describing operation of the control strategy in identifying a transient clutch slip request is shown. Again, the magnitude of the transmission input shaft torque peak-to-peak change will be used as the representative example. Controller 32 identifies a transient clutch slip request at block 112 based on various inputs. As shown in FIG. 5, the various inputs include: the magnitude of the sensed parameter (e.g., the shaft torque peak-to-peak change) at the current operating conditions including the measured clutch slip of block 80; actuator signals such as pedal, brake, etc., as shown in block 114; strategy mode switches as shown in block 116; the base table of required clutch slip versus operating conditions of block 98; and the NVH level versus the magnitude of the sensed parameter (e.g., the torque peak-to-peak change) of block 100. Controller 32 commands the transient clutch slip request to clutch valve 26 in order to control the clutch slip accordingly as shown in block 118.

Controller 32 employs the following operations in identifying the transient clutch slip request. Controller 32 predicts future operating conditions based on current operating conditions and changes in the actuator inputs. Controller 32 identifies the magnitude of the sensed parameter (e.g., the shaft torque peak-to-peak change) at the predicted operating state using the updated table of the torque peak-to-peak change versus operating conditions of block 82. Controller 32 uses the above-described operations employed in calculating the static clutch slip request in the context of the transient clutch slip to calculate the transient clutch slip request. Controller 32 combines the static and dynamic (transient) clutch slip requests (for example, by utilizing a PID controller with feed forward term to obtain the overall clutch slip request.

Referring now to FIG. 5A, with continual reference to FIGS. 4 and 5, a flowchart 130 describing operation of the control strategy in arbitrating between static slip request 102 and transient slip request 118 is shown. A decision is made in block 132 as to which one of static slip request 102 and transient slip request 118 to use. The decision is biased towards selecting the smaller slip request. The selected slip request is output for use as shown in block 134.

Referring now to FIG. 6, a flowchart 120 describing operation of the control strategy in an off-line identification process for building base tables is shown. Again, the magnitude of the transmission input shaft torque peak-to-peak change will be used as the representative example. The off-line identification process includes determining the relationship of NVH rating versus the magnitude of the sensed parameter (e.g., shaft torque peak-to-peak change) and operating conditions as shown in block 122. The tables are built using this relationship information as shown in block 124. From these tables, the allowed magnitude of the sensed parameter (e.g., the allowed shaft torque peak-to-peak change) based on a current operation condition can be identified as shown in block 126. Likewise, from these tables, the allowed clutch slip based on the current operating condition and the magnitude of the sensed parameter (e.g., the shaft torque peak-to-peak change) can be identified as shown in block 128. The allowed clutch slip is further adapted during vehicle operation as shown in block 128.

The following operations are employed in the off-line identification process for building base tables. A structured vehicle NVH drive is performed to evaluate vehicle NVH level versus the magnitude of the sensed parameter (e.g., the shaft torque peak-to-peak change) for varying vehicle operating conditions. Look-up tables for the magnitude of the sensed parameter (e.g., the shaft torque peak-to-peak change) versus allowed NVH level are constructed. Base tables for clutch slip versus the magnitude of the sensed parameter (e.g., the shaft torque peak-to-peak change) to achieve the allowed NVH level are also constructed.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for a powertrain having a transmission and a clutch, comprising:
   identifying a torque of a shaft of the transmission corresponding to a specified noise, vibration, and harshness (NVH) level in the powertrain;
   obtaining a target of a slip of the clutch corresponding to the specified NVH level in the powertrain from a database having corresponding clutch slip target and specified level of NVH pairs;
   sensing the torque of the shaft using a sensor in communication with the shaft; and
   adjusting the slip of the clutch to the clutch slip target to change the torque of the shaft until the torque of the shaft as sensed matches the identified torque such that an amount of NVH in the powertrain based on the torque of the shaft corresponds to the specified NVH level.

2. The method of claim 1 wherein:
   the shaft is an input shaft of the transmission.

3. The method of claim 1 wherein:
   the shaft is an output shaft of the transmission.

4. The method of claim 1 further comprising:
   detecting an amount of NVH in the powertrain based on the torque of the shaft.

5. The method of claim 4 wherein:
   detecting includes detecting the amount of NVH based on a magnitude of the torque of the shaft, wherein the magnitude of the torque is one of peak-to-peak change, half peak-to-peak change, and root-mean-square of the torque of the shaft.

6. A method for a powertrain having a transmission and a clutch, the method comprising:
   identifying a specified noise, vibration, and harshness (NVH) level for the powertrain based on an operating condition of the powertrain;
   identifying a torque of a shaft of the transmission corresponding to the specified NVH level for the powertrain;
   obtaining a target of a slip of the clutch corresponding to the specified NVH level in the powertrain from a database having corresponding clutch slip target and specified level of NVH pairs;
   sensing the torque of the shaft using a sensor in communication with the shaft;
   detecting an amount of NVH in the powertrain based on the torque of the shaft; and
   adjusting the slip of the clutch to the clutch slip target to change the torque of the shaft until the torque of the shaft as sensed matches the identified torque so that the detected amount of NVH in the powertrain matches the specified level of NVH for the powertrain.

7. The method of claim 6 wherein:
   the shaft is an input shaft of the transmission.

8. The method of claim 6 wherein:
   the shaft is an output shaft of the transmission.

9. The method of claim 6 wherein:
   the amount of NVH is detected based on a magnitude of the torque of the shaft, wherein the magnitude of the torque is one of peak-to-peak change, half peak-to-peak change, and root-mean-square of the torque of the shaft.

10. A method for a powertrain having a transmission and a clutch, comprising:
    identifying a parameter of shaft of the transmission corresponding to a specified NVH level in the powertrain;
    obtaining a clutch slip target corresponding to the specified NVH level; from a database having corresponding clutch slip target and NVH level pairs
    adjusting clutch slip to the target to change the parameter of the shaft until the parameter as sensed matches the identified parameter.

11. The method of claim 10 wherein:
    the sensed parameter of the output shaft is torque of the output shaft.

12. The method of claim 10 wherein:
the sensed parameter of the output shaft is speed of the output shaft.

13. The method of claim 10 wherein:
the sensed parameter of the output shaft is acceleration of the output shaft.

* * * * *